United States Patent [19]
Robb

[11] Patent Number: 6,085,881
[45] Date of Patent: Jul. 11, 2000

[54] FLUID COUPLING DEVICE AND ANTI-DRAIN BACK STRUCTURE THEREFOR

[75] Inventor: Neil E. Robb, Jackson, Mich.

[73] Assignee: BorgWarner Inc., Troy, Mich.

[21] Appl. No.: 09/249,297

[22] Filed: Feb. 22, 1999

[51] Int. Cl.[7] .................................................. F16D 31/08
[52] U.S. Cl. ...................................... 192/58.682; 192/827
[58] Field of Search ............................ 192/58.682, 58.5, 192/58.6, 58.63, 82 T

[56] References Cited

U.S. PATENT DOCUMENTS

5,070,980  12/1991  Nakagawa ............................... 192/58.8

*Primary Examiner*—Charles A Marmor
*Assistant Examiner*—Saúl Rodríguez
*Attorney, Agent, or Firm*—Baker & Daniels; Greg Dziegielewski

[57] ABSTRACT

A fluid coupling device having an input coupling member (11) disposed within an operating chamber (33), and operable to transmit torque to an output coupling assembly including a body (15) and a cover (17). Attached to the cover (17) is a valve plate (31) to separate the operating chamber (33) from a reservoir chamber (35), the valve plate defining a fill port (43a, 43b). In order to eliminate morning sickness, which results from the bleed back of fluid though the fill port, an accumulator plate (59) is provided, attached to the cover (17) to define an accumulator chamber (67) within the operating chamber (33). When the engine is turned off, any fluid draining from the reservoir back through the fill port is contained within the accumulator chamber (67), and prevented from flowing directly into the viscous shear chamber (53,55), which would result in morning sickness. After the engine is started, fluid flows from the accumulator chamber and fills the shear chamber in the normal manner.

20 Claims, 4 Drawing Sheets

FLUID COUPLING DEVICE AND ANTI-DRAIN BACK STRUCTURE THEREFOR

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE DISCLOSURE

The present invention relates to fluid coupling devices of the type including both a fluid operating chamber and a fluid reservoir chamber, and valving which controls the quantity of fluid in the operating chamber.

Although the present invention may be used advantageously in fluid coupling devices having various configurations and applications, it is especially advantageous in a coupling device of the type used to drive a radiator cooling fan of an internal combustion engine, and will be described in connection therewith.

Fluid coupling devices ("fan drives") of the viscous shear type have been popular for many years for driving engine cooling fans, primarily because their use results in a substantial saving of engine horsepower. The typical fluid coupling device operates in the engaged, relatively higher speed condition only when cooling is needed, and operates in a disengaged, relatively lower speed condition when little or no cooling is required.

For many years, one of the problems associated with fluid coupling devices used to drive radiator cooling fans has been the phenomenon known as "morning sickness". A typical viscous fan drive includes one or more fill openings, through which viscous fluid flows from the reservoir into the operating chamber, and one or more discharge openings through which fluid is pumped from the operating chamber back into the reservoir. After the fan drive has been operating for a period of time, and the engine is turned off, the fan drive ceases rotation. When the fan drive stops rotating, the orientation of the fill and discharge openings is completely unpredictable, i.e., the fill opening could be in the three o'clock position and the discharge opening could be in the nine o'clock position, in which case there would probably be relatively little "drain back" or "bleed back", i.e., a flow of fluid from the reservoir back into the operating chamber.

However, the fan drive could stop with the discharge opening in the six o'clock position and the fill opening in the twelve o'clock position, in which case the discharge opening would be beneath the level of the fluid in the reservoir. When this situation occurs, it has been conventional for a certain amount of fluid to bleed back from the reservoir through the discharge opening, into the operating chamber. Then, when operation of the fan drive would begin again, after a long period of time (for example, the next morning), with a substantial amount of fluid in the operating chamber, even though the engine is cold and no cooling is required, the fan drive would initially operate in the engaged condition for a period of time until most of the fluid in the operating chamber is pumped back into the reservoir. Unfortunately, such engaged operation results in an undesirable noise of the fan being driven when it is not required. It is this phenomenon, most common and perhaps most objectionable in the morning, which has been referred to as "morning sickness".

Several substantial improvements to overcome the problem of morning sickness have been developed by the assignee of the present invention, such solutions being illustrated and described in U.S. Pat. Nos. 4,312,433 and 5,101,950, both of which are assigned to the assignee of the present invention and are incorporated herein by reference. In both of the cited patents, the general approach to the problem of morning sickness has been to configure the discharge flow path (i.e., the path from the operating chamber, past the pump out means and back to the reservoir) such that fluid in the reservoir would be unable to flow backwards through the discharge path and into the operating chamber, regardless of the rotational orientation of the fan drive during periods of engine shut down.

Unfortunately, it has been observed that, even in the presence of the anti-bleed back solutions in the above-cited patents, a certain amount of bleed back or drain back can still occur through the fill opening whenever, for example, the fan drive stops rotating with the fill opening in the six o'clock position (i.e., below the fluid level) and the discharge opening in the twelve o'clock position. As is well known to those skilled in the art, the fill port needs to be near the radially outer periphery of the reservoir chamber, in order to facilitate filling of the operating chamber, but then, the fill port is even more likely to be well below the fluid level in the reservoir chamber. The bleed back through the fill opening can occur in one of three ways. First, if, as a result of manufacturing inaccuracies or otherwise, the valve arm does not seal tightly over the fill opening, bleed back will occur. Second, if the ambient air temperature around the fan drive is relatively high when the fan drive stops rotating, the valve arm will open (or remain open) and allow fluid to flow from the reservoir into the operating chamber. Third, an electronically controlled fan drive that is of the "fail-safe ON" type will have its valve opened when the electrical power is turned off.

Those skilled in the art have attempted to reduce drain back through the fill opening by improving the capability of the valve arm to seal the fill opening. However, reducing drain back in this manner is difficult and expensive, and even with a perfect seal, there would still be drain back whenever the valve arm would not be covering the fill port at the time the fan drive stopped rotating, as in the second and third scenarios discussed above.

BRIEF SUMMARY OF THE INVENTION

Accordingly, it is an object of the present invention to provide an improved fluid coupling device of the type which effectively reduces drain back through the fill opening, or at least substantially reduces the undesirable effects thereof It is a more specific object of the present invention to provide an improved fluid coupling device including structure which accumulates fluid draining back through the fill opening, rather than allowing such fluid to flow directly into the operating chamber.

It is another object of the present invention to provide an improved fluid coupling device which accomplishes the above-stated objects without the addition of any substantial amount of structure, size or manufacturing cost.

The above and other objects of the invention are accomplished by the provision of a fluid coupling device of the type including a first rotatable coupling member defining an axis of rotation, and an enclosure associated with the first coupling member to define a fluid chamber therebetween. Valve means is associated with one of the first coupling member and the enclosure and includes a valve plate disposed to separate the fluid chamber into a fluid operating chamber and a fluid reservoir chamber. A second rotatable coupling member is disposed in the fluid operating chamber and is rotatable relative to the first coupling member. One of the first coupling member and the enclosure cooperates with the second coupling member to define a viscous shear space therebetween. The valve plate defines a fill port permitting fluid communication from the reservoir chamber into the operating chamber. The device includes means operable to pump fluid from the operating chamber to the reservoir chamber in response to a difference in speed of rotation of the first and second coupling members. The valve means includes a valve arm moveable between an open position permitting fluid flow through the fill port, and a closed position blocking substantial flow through the fill port.

The improved fluid coupling device is characterized by means operably associated with the valve plate to define an accumulator chamber disposed generally within the operating chamber. The accumulator chamber includes an inlet region disposed to receive fluid flowing through the fill port, and an outlet region from which fluid flows out of the accumulator chamber and toward the viscous shear space.

DETAILED DESCRIPTION OF THE PREFERRED EMBODIMENT

Figure 1:
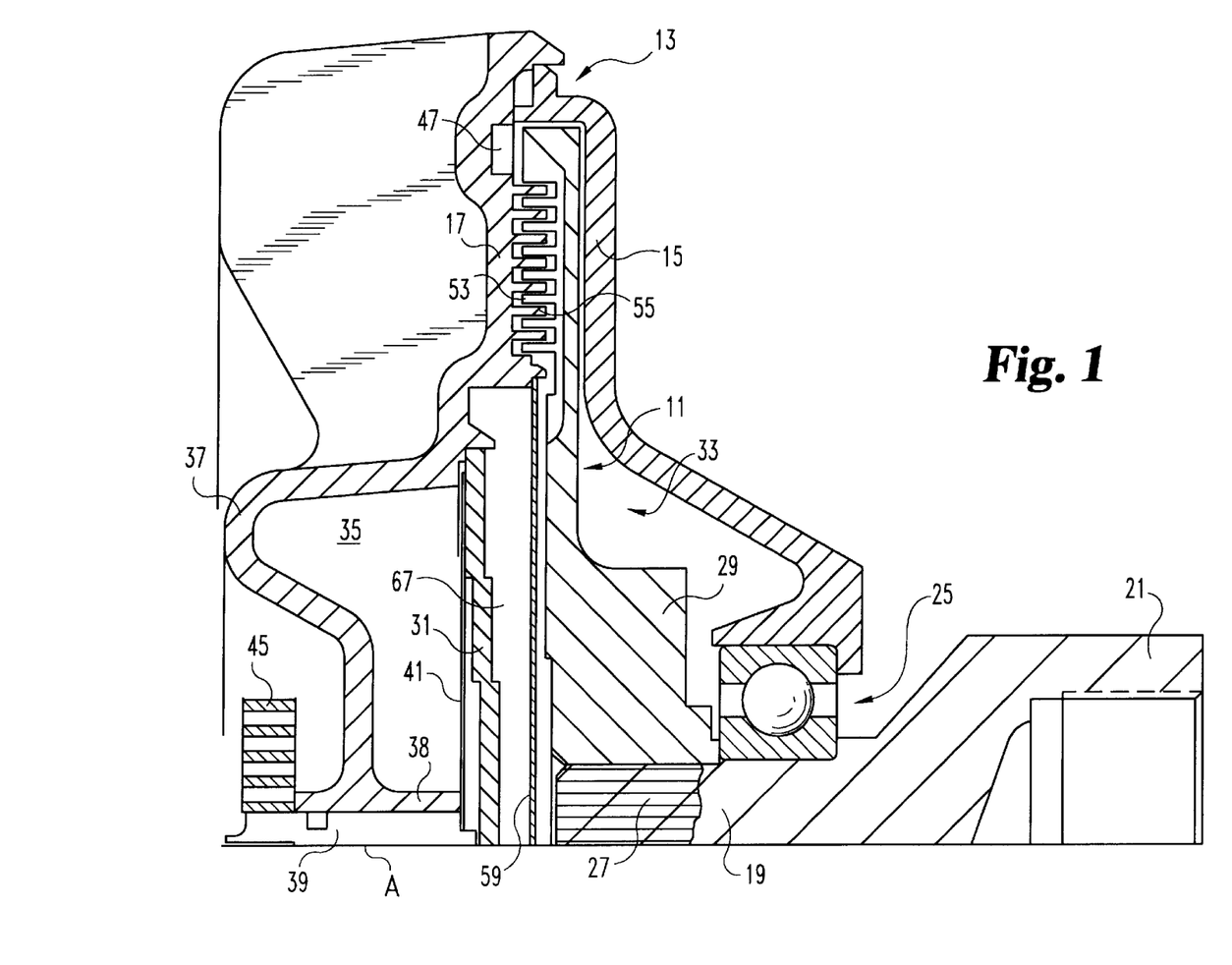
FIG. 1 is an axial cross-section of one-half of a typical fluid coupling device modified to include the present invention.

Referring now to the drawings, which are not intended to limit the invention, FIG. 1 illustrates one preferred form of a fluid coupling device ("viscous fan drive") of a type utilizing the present invention. The fluid coupling device of FIG. 1 includes an input coupling member generally designated 11, and an output coupling assembly, generally designated 13. The assembly 13 includes a die cast housing member (body) 15, and a die cast cover member (enclosure) 17, the members 15 and 17 being secured together by a rollover of the outer periphery of the cover member 17, as is well known in the art. It should be understood that the present invention is not limited to use with a cast cover member, but may also be used in a viscous fan drive of the type including a stamped cover member.

The fluid coupling device is adapted to be driven by a liquid cooled engine, and in turn, drives a radiator cooling fan, neither of which are shown herein. The fan may be attached to the housing member 15 by any suitable means, such as is generally well known in the art, and as is illustrated in the above-incorporated patents. It should be understood, however, that the use of the present invention is not limited to any particular configuration of fluid coupling device, or fan mounting arrangement, or any particular application for the fan drive, except as is specifically noted hereinafter. For example, the present invention could be used with a fan drive of the type adapted to have the radiator cooling fan attached to the cover member, rather than to the body member.

The coupling device includes an input shaft 19 on which the input coupling member 11 is mounted. The input shaft 19 is rotatably driven, such as by means of an hexagonal, internally threaded portion 21, which would typically be threaded onto an externally threaded shaft extending from the engine water pump. The input shaft 19 functions as a support for the inner race of a bearing set 25, which is seated on the inside diameter of the housing member 15. The forward end (left end in FIG. 1) of the input shaft 19 has an interference fit between a serrated portion 27 and an opening defined by a hub portion 29 of the input coupling member 11. As a result, rotation of the input shaft 19 causes rotation of the input coupling member 11.

The housing member 15 and the cover member 17 cooperate to define a fluid chamber, which is separated by means of a circular plate-like member (valve plate) 31, into a fluid operating chamber 33, and a fluid reservoir chamber 35. Thus, it may be seen that the input coupling member 11 is disposed within the fluid operating chamber 33.

Figure 2:
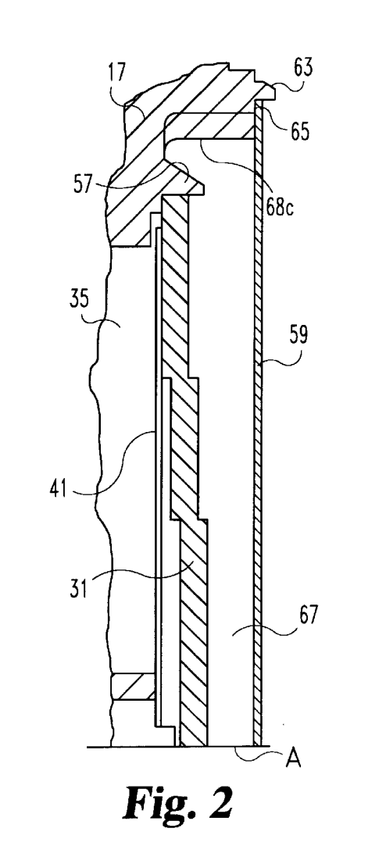
FIG. 2 is an enlarged, fragmentary, axial cross-section similar to FIG. 1, but showing only the structure associated with the present invention.
Figure 2A:
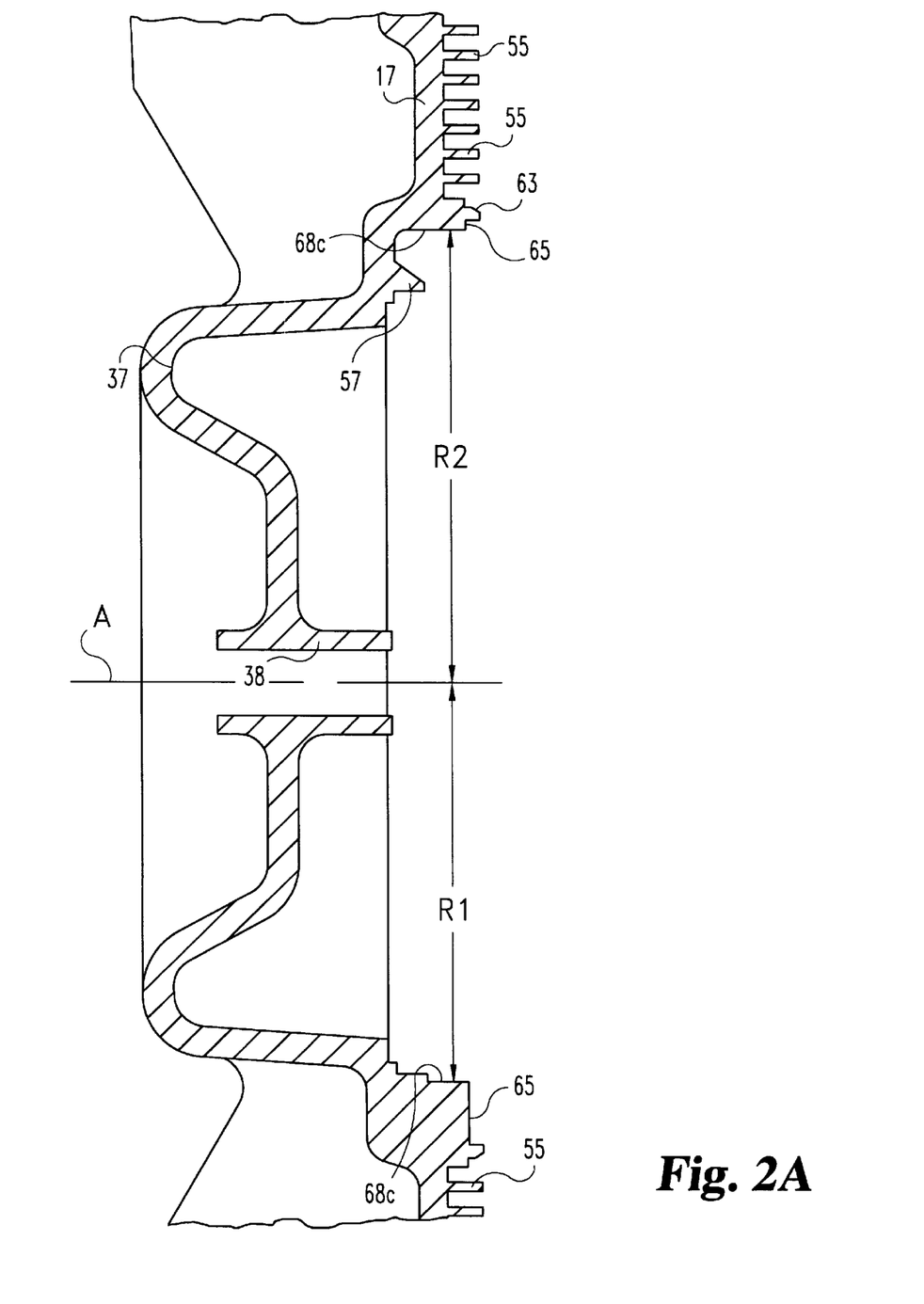
FIG. 2A is an enlarged, fragmentary, axial cross-section, taken in the direction of line 2A–2A of FIG. 3, but showing only the cover member of the invention.
Figure 3:
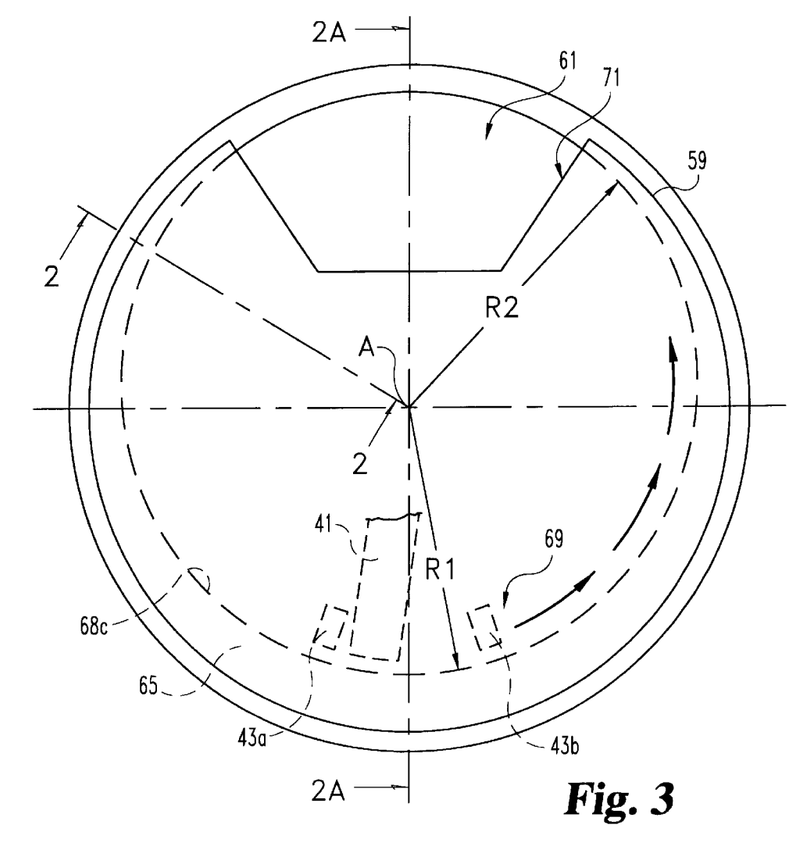
FIG. 3 is a somewhat schematic plan view, taken from the right in FIG. 2, further illustrating a key element of the present invention.

The cover member 17 defines a raised, annular reservoir-defining portion 37, which is disposed to be generally concentric about an axis of rotation A of the device, and further defines a generally cylindrical shaft support portion 38 (see also FIG. 2A). Rotatably disposed within the support portion 38 is a valve shaft 39, extending outwardly (to the left in FIG. 1) through the cover member 17. Attached to the inner end (right end in FIG. 1) of the valve shaft 39 is a valve arm 41, which may be better understood by reference to the above-incorporated patents. Movement of the valve arm 41 controls the flow of fluid from the reservoir chamber 35 to the operating chamber 33, through a fill opening, not shown in FIGS. 1 and 2, but shown in FIG. 3 as a pair of fill openings 43a and 43b. However, it should be understood that the use of the present invention is not limited to any particular fill opening arrangement, or number of ports. For ease of illustration, only a portion of one leg of the valve arm 41 is shown in FIG. 3, but those skilled in the art understand that the valve arm moves between one position blocking flow through the fill openings, and another position uncovering the fill openings. Operatively associated with the outer end of the valve shaft 39 is a temperature-responsive bimetal element, comprising a conventional coil member 45, which includes an inner end portion in engagement with the valve shaft 39.

The manner in which the bimetal coil member 45 operates to control the movement of the valve arm 41, in response to variations in a predetermined temperature condition, is well known in the art, is not an essential of the present invention, and will not be described further herein. It should be understood by those skilled in the art that the present invention could be used in fluid coupling devices in which the control of the valving takes some form other than the bimetal coil member 45. For example, and within the scope of the invention, the control of the valving could be by means of an actuator receiving an electrical, pneumatic, or hydraulic signal representative of a sensed condition, such as the radiator "top tank" temperature.

Disposed adjacent the radially outer periphery of the operating chamber 33, the cover member 17 includes a pumping element 47, also referred to as a "wiper" element, operable to engage the relatively rotating fluid in the operating chamber 33, and generate a localized region of relatively higher fluid pressure. As a result, the pumping element 47 continually pumps a small quantity of fluid from the operating chamber 33 back into the reservoir chamber 35 through a radial passage (not shown in the section of FIG. 1) defined by the cover member 17, in a manner well known in the art, which forms no essential part of the present invention, and will not be described further herein.

In the subject embodiment of the invention, and by way of example only, the input coupling member 11 includes a forward surface which defines a plurality of annular lands 53. The adjacent surface of the cover member 17 forms a plurality of annular lands 55 (see also FIG. 2A). The annular lands 53 and 55 are interdigitated to define a serpentine-shaped viscous shear space therebetween, the viscous shear space being referred to hereinafter by means of the reference numerals 53 and 55. It is believed that in view of the above-incorporated U.S. Patents., those skilled in the art can fully understand the construction and operation of the fluid coupling device illustrated in FIG. 1, as well as the various flow paths for the viscous fluid. The anti-drain back structure of the present invention could also be used in fan drives in which the lands and grooves are formed between the input coupling member and the housing (body) member.

Referring now primarily to FIGS. 2 and 2A, and as is well known in the art, the valve plate 31 is fixed relative to the cover member 17 by means of a cast and/or machined rollover portion 57. The portion 57 is annular, and after the valve plate 31 is positioned as shown in FIG. 2, the rollover portion 57 is rolled over (or deformed) to trap the valve plate 31 in place, in the position shown. This is quite well known to those skilled in the art, forms no essential part of the present invention, and will not be described further herein.

Referring now primarily to FIGS. 2, 2A and 3 together, and in accordance with an important aspect of the invention, there is provided an accumulator plate 59. As may best be seen in FIG. 3, the accumulator plate 59 is generally annular, except for a cut-out potion, generally designated 61, the function of both the plate 59 and the cut-out portion 61 to be described subsequently.

Although not an essential feature of the invention, the accumulator plate 59 may be attached to the cover member 17 in generally the same manner as is the valve plate 31. Just radially inward from the innermost annular land 55, the cover member 17 defines an annular rollover portion 63, and adjacent the rollover portion 63, the cover member 17 defines an annular seat surface 65, against which the outer periphery of the accumulator plate 59 is disposed. As may best be seen in FIG. 3, the seat surface 65 is generally crescent-shaped, for reasons which will become apparent subsequently. After the plate 59 is in the position shown in FIG. 2, the rollover portion 63 may be rolled over (or deformed) in the same manner as was the rollover portion 57, thus trapping and retaining the accumulator plate 59 in the position shown. It should be understood by those skilled in the art that the accumulator plate 59, and its manner of attachment to the cover member 17, as shown herein, is merely one embodiment of the invention.

In the subject embodiment, the function of the accumulator plate 59 is to cooperate with the cover member 17 and the valve plate 31 to define an accumulator chamber 67. It should be apparent that, as used herein, terms such as "cooperate" and "associated with" in regard to the relationship of the valve plate 31 and the accumulator plate 59 do not require that the plates 31 and 59 be in contact. The term "accumulator" is used herein in reference to the chamber 67 to describe the important aspect of the present invention in which it is recognized that under various operating conditions, fluid will drain back or bleed back from the reservoir chamber 35 into the operating chamber 33. Therefore, a further aspect of the invention is to recognize that a certain amount of bleed back will occur and provide some sort of structure which defines the accumulator chamber 67, such that, any fluid draining back through the fill opening 43a or 43b will enter the accumulator chamber 67, rather than flowing directly into the viscous shear space 53,55.

Referring again to FIGS. 2, 2A and 3 together, it may be seen that in the subject embodiment, the accumulator chamber 67 is defined, at its forward portion, by the valve plate 31, and at its rearward portion, by the accumulator plate 59. In addition, the accumulator chamber 67 is defined (or bounded), on its outer periphery, by a generally cylindrical surface 68c. Although both of the rollover portions 57 and 63 are concentric about the axis of rotation A, such is not the case for the cylindrical surface 68c, as will be described in greater detail subsequently.

For example, if the vehicle engine is turned off and the fluid coupling device of the invention stops rotating in the position shown in FIG. 3, which is a "worst case" scenario, and if the ambient air temperature near the fan drive is warm enough, at least initially, to keep the valve arm 41 in the open position, the fill ports 43a and 43b will be totally uncovered. Therefore, most of the fluid in the reservoir chamber 35 will flow through the fill ports 43a and 43b and fill the accumulator chamber 67 up to approximately the axis of rotation A.

However, in accordance with the most important aspect of the invention, the fluid will remain in the accumulator chamber 67, rather than flowing into the operating chamber and filling a major portion of the viscous shear space 53,55 (i.e., most of the space below the axis of rotation A). This is the reason for the cut-out portion 61 being disposed diametrically opposite the fill ports 43a and 43b, i.e., to retain within the accumulator chamber 67 whatever fluid flows into the chamber 67. Those skilled in the art will understand that, if the engine were turned off with the fill ports 43a and 43b at the twelve o'clock position, and the cut-out portion 61 at the six o'clock position, no fluid would be able to drain back from the reservoir chamber 35 through the fill ports, and the fact that the cut-out portion 61 would then be below the fluid level would not matter, because there would be no fluid in the accumulator chamber 67.

After the engine has been turned off for a while, the ambient air temperature decreases to the point at which the bimetal coil member 45 turns the valve arm 41 to its closed position, blocking the fill ports 43a and 43b as is well known in the art. However, without the present invention, such closing of the valve arm 41 is too late to prevent the drain back of fluid into the viscous shear space, in the manner described previously. With the present invention, whatever fluid drains back through the fill ports 43a and 43b is accumulated or contained within the chamber 67. Therefore, it is important that the accumulator chamber 67 be "fluid tight", i.e., not in the sense of being fluid tight under substantial pressure (a condition which does not normally occur in a fan drive), but merely "fluid tight" under atmospheric pressure, such that the viscous fluid present in the chamber 67 will not leak through the rollover at the outer periphery of the plate 59. Such leakage would permit fluid to flow into the operating chamber 33, thus defeating the purpose of the invention.

When the engine is next turned on, and the fan drive begins to rotate, the fluid in the accumulator chamber 67 will flow from an inlet region 69 of the chamber 67 (i.e., the region near the fill ports 43a and 43b) and will flow around the outer periphery of the chamber 67 (see arrows) until reaching an outlet region near the cut-out portion 61, the outlet region being generally designated 71, and assuming clockwise rotation as viewed in FIG. 3. As fluid flows from the outlet region 71, it enters a region of the chamber 67 which is axially adjacent the cut-out portion 61. Once fluid reaches the region of the cut-out portion 61, it is free to flow radially outward, out of the chamber 67 and then the fluid flows into the viscous shear space 53,55.

Preferably, near the inlet region 69, the cylindrical surface 68c defines a radius R1 (see FIGS. 2A and 3), and the radius of the surface 68c gradually increases in a direction toward the outlet region 71, to a radius R2. In the subject embodiment, and by way of example only, the radius R2 is approximately 20% greater than the radius R1, such that the surface 68c defines, in effect, an outward spiral. It has been found, in connection with the development of the invention, that the spiral of the surface 68c is important in regard to the reaction time of the fan drive, the "reaction time" being normally expressed as the time period from the opening of the valve arm 41 until the fan drive reaches a predetermined fan speed. In other words, although the invention substantially solves the problem of morning sickness, the inventive solution would not be acceptable if the result were a major increase in the reaction time, such that the engine could overheat before the fan drive reached its fully engaged condition.

Thus, it has been found that, if the radius of the surface were constant, the reaction time would be in the range of about 60 seconds, much greater than is desirable. However, with the spiral configuration of the surface 68c shown in FIG. 3, the reaction time was only about 30 seconds, well within the acceptable range. It is believed that the spiral shape promotes the rate of flow from the inlet region 69 to the outlet region 71.

Figure 4:
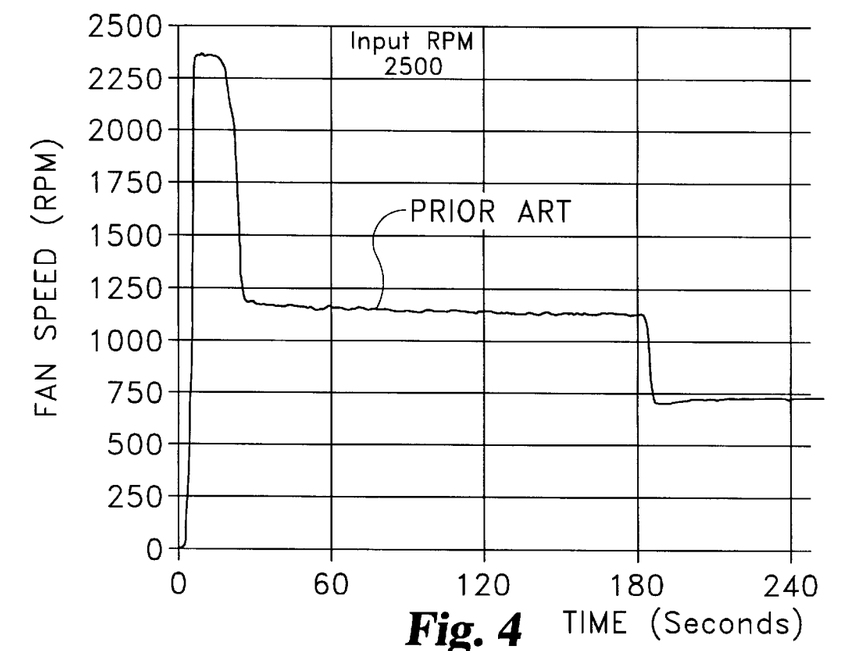
FIG. 4 is a graph of fan speed, in RPM versus Time in seconds, illustrating the operation of the "PRIOR ART" device.
Figure 5:
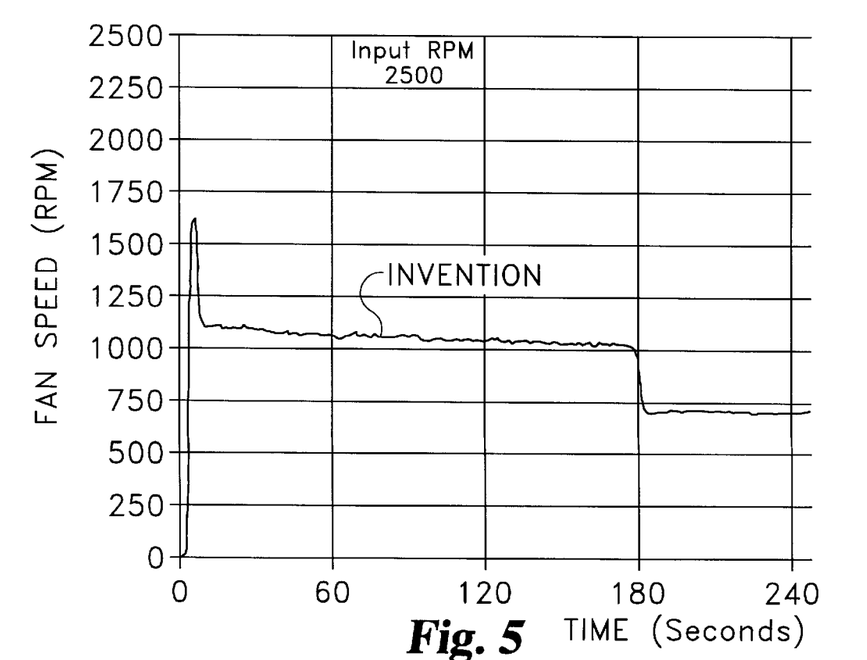
FIG. 5 is a graph of fan speed in RPM versus Time in seconds, illustrating the improved operation of the device of the "INVENTION".

Referring now primarily to FIGS. 4 and 5, there are graphs of Fan Speed versus Time, comparing the "INVENTION" to the "PRIOR ART". In generating the graphs of FIGS. 4 and 5, two otherwise identical (except for the absence or presence of the invention) fan drives were utilized. Initially, the input speed to both fan drives was 2500 RPM, with the "Initial Box" temperature for both fan drives being about 114 degrees Fahrenheit. The PRIOR ART device was operated, and then stopped with the fill port in its "best" position, i.e., with the fill port in the twelve o'clock position, the position which should have resulted in the least drain back. After a period of 60 minutes, the device was driven at 2500 RPM, causing the fan speed to rise rapidly to about 2300 RPM and remain there for about 20 seconds (see FIG. 4), before dropping back down to the "disengaged" level (about 1150 RPM). Those skilled in the art will recognize that 20 seconds at 2300 RPM fan speed is excessive upon a cold start-up.

When the same test was performed using the device of the INVENTION, the fan drive was operated, and then stopped with the fill port in its "worst" position, i.e., at the six o'clock position, which should have resulted in the most drain back. After the same period of 60 minutes, the fan drive was driven at 2500 RPM, causing the fan speed to increase to only about 1600 RPM, and remain there for only several seconds (see FIG. 5), before dropping back down to the disengaged level. Those skilled in the art will recognize that several seconds at 1600 RPM would be considered as the total absence of "morning sickness".

Referring again to FIG. 3, it may be seen that the spiral shape of the surface 68c extends both directions from the inlet region 69, such that the fan drive is bidirectional, with regard to this particular feature. However, if such is not needed, the accumulator plate 59 could be replaced with some other structure which would provide the same functional result, i.e., accumulating any fluid draining back through the fill port, and keeping the fluid from flowing into the operating chamber as long as the fan drive is stopped. Preferably, and as described above, the structure defining the accumulator chamber should be configured such that, upon start-up, when engagement is desired, the structure does not delay the filling of the lands and grooves excessively. By way of example only, the accumulator chamber could be defined by a "duct-shaped" three- or four-sided sheet metal member, having an inlet and an outlet, which would be brazed or welded to the valve plate, as long as the inlet and the outlet regions are separated in about the same manner as shown in FIG. 3.

In some fan drives which are remotely actuated, it is considered desirable to design the fan drive to operate as "fail-safe" in the "ON" position, i.e., if the remote actuation fails, the valve will remain in a position uncovering the fill port, and the fan drive will stay in an engaged mode. Prior to the present invention, such fail-safe ON would have been considered not feasible, because of the morning sickness problem, and the resulting drain back. However, the present invention will now give the cooling system designer the option of offering this fail-safe ON capability.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A fluid coupling device having a first rotatable coupling member defining an axis of rotation, an enclosure associated with said first coupling member to define a fluid chamber there between; valve means associated with one of said first coupling member and said enclosure and including a valve plate disposed to separate said fluid chamber into a fluid operating chamber and a fluid reservoir chamber, and being rotatable relative to said first coupling member; one of said first coupling member and said enclosure cooperating with said second coupling member to define a viscous shear space there between; said valve plate defining a fill port permitting fluid communication from a said reservoir chamber into a said operating chamber; means operably to pump fluid from a said operating chamber to a said reservoir chamber in response to a difference in speed of rotation of said first and second coupling members; said valve means including a valve arm movable between an open position permitting fluid flow through said fill port, and a closed position blocking substantial fluid flow through said fill port; characterized by:

(a) means operably associated with said valve plate to define an accumulator chamber disposed generally within a said operating chamber; and (b) said accumulator chamber being operably independent of a said valve arm and including an inlet region disposed to receive fluid flowing through said fill port, and an outlet region from which fluid flows out of said accumulator chamber and toward said viscous shear space.

2. A fluid coupling device as claimed in claim 1, characterized by said valve plate comprising a relatively thin, generally flat plate member oriented generally perpendicular to said axis of rotation.

3. A fluid coupling device as claimed in claim 2, characterized by said valve arm comprising a relatively thin, generally flat valve member lying in a plane generally parallel to said valve plate, and moveable in said plane between said open position and Said closed position.

4. A fluid coupling device as claimed in claim 2, characterized by said means defining said accumulator chamber includes a generally flat accumulator plate oriented generally parallel to said valve plate and spaced apart therefrom to define therebetween said accumulator chamber.

5. A fluid coupling device as claimed in claim 1, characterized by said means defining said accumulator chamber includes an outer wall surface having a radius which increases from a first radius in said inlet region toward a second radius in said outlet region, said second radius being greater than said first radius, thereby improving the response time of fluid flowing from said fill port to said viscous shear space.

6. A fluid coupling device comprising:

a first rotatable coupling member defining an enclosure forming a fluid chamber;

a valve plate disposed within a said fluid chamber to separate said a fluid chamber into an operating chamber and a reservoir chamber, and defining at least one valve port permitting fluid communication between a said reservoir chamber and said an operating chamber;

a second rotatable coupling member disposed within said operating chamber and rotatable relative to said first coupling member, said first and second coupling members defining a viscous shear space there between;

valve means for controlling flow through said at least one valve port; and means, operably independent of said valve means, for defining an accumulator chamber within a said operating chamber and having an inlet region for receiving fluid flowing through said at least one valve port and an outlet region, independent of a said inlet region, through which fluid flows from a said accumulator chamber toward said viscous shear space.

7. The fluid coupling device as claimed in claim 6, wherein said means for defining an accumulator chamber includes an accumulator plate spaced apart from said valve plate to define a said accumulator chamber there between.

8. The fluid coupling device as claimed in claim 7, wherein said means defining an accumulator chamber includes an outer wall disposed between said valve plate and said accumulator plate, said outer wall having a first portion at said inlet region defined at a first radius, and a second portion at said outlet region defined at a second radius greater than said first radius.

9. The fluid coupling device as claimed in claim 6, wherein said accumulator plate has a substantially circular shape interrupted by a cutout portion at said outlet region, whereby fluid flows between a said accumulator chamber and said viscous shear space through a said cutout portion.

10. The fluid coupling device as claimed in claim 9, wherein said cutout portion has a trapezoidal shape.

11. The fluid coupling device as claim in claim 6, wherein:

said first coupling member defines an axis of rotation about which said first and second coupling members rotate; and said inlet region is substantially diametrically opposite said outlet region relative to a said axis of rotation.

12. A fluid coupling device comprising:

an enclosure forming a fluid chamber;

first and second coupling members disposed within a said fluid chamber and rotatable relative to each other along an axis of rotation, a said coupling members defining a viscous shear space there between;

a first plate disposed within a said fluid chamber and defining at least one first opening there through at a first position radially offset from a said axis of rotation; and a second plate disposed within a said fluid chamber and defining a second opening there through at a second position radially offset from a said axis of rotation, whereby said first and second plates define first, second and third chambers within a said fluid chamber, with fluid flow between a said first and second chambers restricted to said at least one first opening, and fluid flow between said second and third chambers restricted to a said second opening.

13. The fluid coupling device as claimed in claim 12, wherein said second position is substantially diametrically opposite said first position relative to a said axis of rotation.

14. The fluid coupling device as claimed in claim 12, further comprising a valve assembly associated with a said first plate and operable to selectively open said at least one first opening.

15. The fluid coupling device as claimed in claim 12, wherein said at least one first opening defines a first fluid flow area and a said second opening defines a second fluid flow area greater than a said first fluid flow area.

16. A fluid coupling device comprising:

a first rotatable coupling member defining an enclosure forming a fluid chamber;

a valve plate disposed within a said fluid chamber to separate a said fluid chamber into an operating chamber and a reservoir chamber;

a second rotatable coupling member disposed within a said operating chamber and rotatable relative to a said first coupling member, said first and second coupling members defining a viscous shear space there between; and an accumulator chamber defined within a said operating chamber and having an inlet flow path communicating with a said reservoir chamber and an outlet flow path, independent of said inlet flow path, communicating with said viscous shear space.

17. The fluid coupling device as claimed in claim 16, further comprising valve means disposed only at said inlet flow path for controlling fluid flow through said inlet flow path into said accumulator chamber.

18. The fluid coupling device as claimed in claim 16, wherein:

said first and second coupling members are rotatable about an axis of rotation; and said inlet and outlet flow paths are radially offset from said axis of rotation and substantially diametrically opposite each other.

19. The fluid coupling device as claimed in claim 16, wherein said inlet flow path includes at least one inlet port defined in said valve plate.

20. The fluid coupling device as claimed in claim 16, wherein:

said accumulator chamber is defined by said valve plate and an accumulator plate disposed within said fluid chamber between said valve plate and said viscous shear space; and said outlet flow path includes an opening defined in said accumulator plate.

* * * * *

UNITED STATES PATENT AND TRADEMARK OFFICE
CERTIFICATE OF CORRECTION

PATENT NO : 6,085,881
DATED : July 11, 2000
INVENTOR(S) : Neil E. Robb

It is certified that error appears in the above-identified patent and that said Letters Patent are hereby corrected as shown below:

Col. 8, line 48 after the words "reservoir chamber" insert -- ; a second rotatable coupling member disposed in said fluid operating chamber --

This language was in claim 1 as originally filed. The language was inadvertently not included in an amendment to claim 1, but was not deleted.

Col. 8, line 55, change two occurrences of "a said" to -- said --
Col. 8, line 64, change "a said" to -- said --.
Col. 8, line 66, change "a said" to -- said --.
Col. 9, line 35, change "a said" to -- said --.
Col. 9, line 46, change "a said" to -- said --.
Col. 9, line 49, change "a said" to -- said --.
Col. 9, line 50, change "a said" to -- said --.
Col. 9, line 55, change "a said" to -- said --.
Col. 10, line 11, change "a said" to -- said --.
Col. 10, line 15, change "a said" to -- said --.
Col. 10, line 17, change "a said" to -- said --.
Col. 10, line 20, change "a said" to -- said --.
Col. 10, line 22, change "a said" to -- said --.
Col. 10, line 23, change "a said" to -- said --.
Col. 10, line 25, change "a said" to -- said --.
Col. 10, line 27, change "a said" to -- said --.
Col. 10, line 28, change "a said" to -- said --.
Col. 10, line 31, change "a said" to -- said --.
Col. 10, line 35, change "a said" to -- said --.
Col. 10, line 37, change "a said" to -- said --.
Col. 10, line 42, change "a said" to -- said --.

UNITED STATES PATENT AND TRADEMARK OFFICE
CERTIFICATE OF CORRECTION

PATENT NO : 6,085,881
DATED : July 11, 2000
INVENTOR(S) : Neil E. Robb

It is certified that error appears in the above-identified patent and that said Letters Patent are hereby corrected as shown below:

Col. 10, line 44, change "a said" to - - said - -.
Col. 10, line 50, change "a said" to - - said - -.
Col. 10, line 52, 53, change two occurrences of "a said" to - - said - -.
Col. 10, line 57, change "a said" to - - said - -.
Col. 10, line 60, change "a said" to - - said - -.

Signed and Sealed this

Twenty-fourth Day of April, 2001

Attest:

NICHOLAS P. GODICI

Attesting Officer

Acting Director of the United States Patent and Trademark Office